Figure 1:
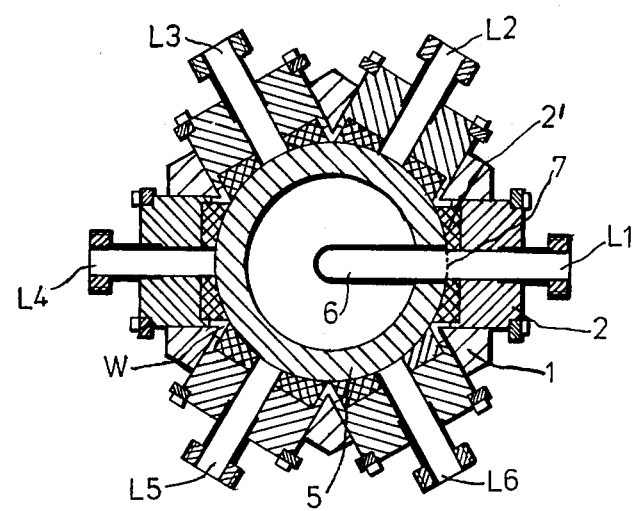

United States Patent [19]

Dölling et al.

[11] 4,191,213

[45] Mar. 4, 1980

[54] CHANGE OVER DEVICE FOR CONTINUOUSLY CASTING VARIOUS EMULSIONS FOR PHOTOGRAPHIC PURPOSES

[75] Inventors: Ludvik Dölling, Holzkirchen; Wilhelm Haag, Hohenbrunn-Riemerling; Herbert Heindze, Hohenschaeftlarn, all of Fed. Rep. of Germany

[73] Assignee: AGFA-Gevaert, A.G., Leverkusen, Fed. Rep. of Germany

[21] Appl. No.: 844,402

[22] Filed: Oct. 21, 1977

[30] Foreign Application Priority Data

Oct. 27, 1976 [DE]  Fed. Rep. of Germany ....... 2648574

[51] Int. Cl.$^2$ .............................................. F16K 11/02
[52] U.S. Cl. .......................... 137/625.17; 137/625.11; 137/238; 137/554; 251/63
[58] Field of Search ...................... 137/625.11, 625.17, 137/554, 238; 251/63, 133

[56] References Cited

U.S. PATENT DOCUMENTS

| 2,869,526 | 1/1959 | Dolza ........................ 137/625.11 X |
| 3,426,796 | 2/1969 | Heintz et al. ............... 137/625.11 X |
| 3,508,582 | 4/1970 | Aulisa ........................ 137/625.11 |

Primary Examiner—William R. Cline
Attorney, Agent, or Firm—Connolly and Hutz

[57] ABSTRACT

A change-over device comprising several connecting tubes is arranged before the coating station in order that during the coating of photographic silver halide emulsions the coating operation need not be interrupted when changing from one emulsion type to the other thus allowing direct coating of one of the emulsions which are fed from the supply containers while the remaining emulsions are recycled into the emulsion line by means of a pressure regulating valve. The outlet of an emulsion is effected by a rotational and lifting movement of the changeover piston.

12 Claims, 4 Drawing Figures

CHANGE OVER DEVICE FOR CONTINUOUSLY CASTING VARIOUS EMULSIONS FOR PHOTOGRAPHIC PURPOSES

The invention relates to a change-over device for continuously coating various emulsions on to a base film for the production of a photographic material, in order to control the flow of the emulsions issuing from the supply containers in such a way that the casting process does not have to be interrupted when changing from one type of emulsion to another.

When coating photographic silver halide emulsions on to flexible film support, these emulsions are fed under pressure from a controlled-temperature supply container through hosepipes or tubes to a coating station. Coating is carried out by means of dip rollers, air brushes, extrusion or suction coating apparatus, or cascading hoppers. Providing the composition of the emulsion is constant, it is coated continuously. As soon as another type of emulsion having another silver halide composition, sensitization or having other photographic properties is used, all of the pipes including the hopper which have been in contact with the previously used emulsion must be cleaned. The coating apparatus is out of operation for this period.

An object of the invention is therefore to eliminate idle periods and to keep the loss of emulsion when changing from one type to another to a minimum.

The invention relates to a change-over device which allows the emulsion to be changed without interrupting the coating process. Although the invention is designed primarily for conveying photographic silver halide emulsions via the change-over device according to the invention, it may also be used for the passage and the change-over of other liquid systems.

According to the invention there is provided a change-over device for continuously coating various emulsions on to a film support for the production of photographic materials, comprising a cylinder which may be subjected to pressure and which has a plurality of radial apertures for receiving sealing plates each of which have an emulsion connection and a return nozzle with a pressure regulating valve; a change-over piston which is capable of executing both rotational and lifting movements in the cylinder and which is provided with a pipe having a radial portion with an opening for communication with a selected emulsion connection and an axial portion with an outlet opening a piston rod connected to the piston and to a drive member a positioning or indexing unit mounted radially and axially on the cylinder and sourrounding the piston rod and the drive member; and a housing which receives the positioning unit and a clutch for transmitting drive to the drive member the housing being connected to the said cylinder.

The size of the change-over device varies with the number of emulsion connections and their nominal widths. Not only silver halide emulsions but also the solutions for photographic auxiliary layers such as filter layers, intermediate layers and protective layers may be conveyed alternately by the device.

The invention also provides a process for continuously coating with emulsions for the production of a photographic material, using a change-over device according to the invention wherein a plurality of emulsions which are ready for coating are fed from supply reservoirs via intermediate containers to the change-over device, and a selected emulsion is fed via the pipe of the change-over piston to a coating station while the other emulsions are recycled via the pipes, the change-over from one emulsion to another being effected directly in the change-over device by releasing the corresponding emulsion pipe or indirectly by supplying a washing solution from a container and subsequently changing over to the inlet of the other emulsion.

Figure 2:
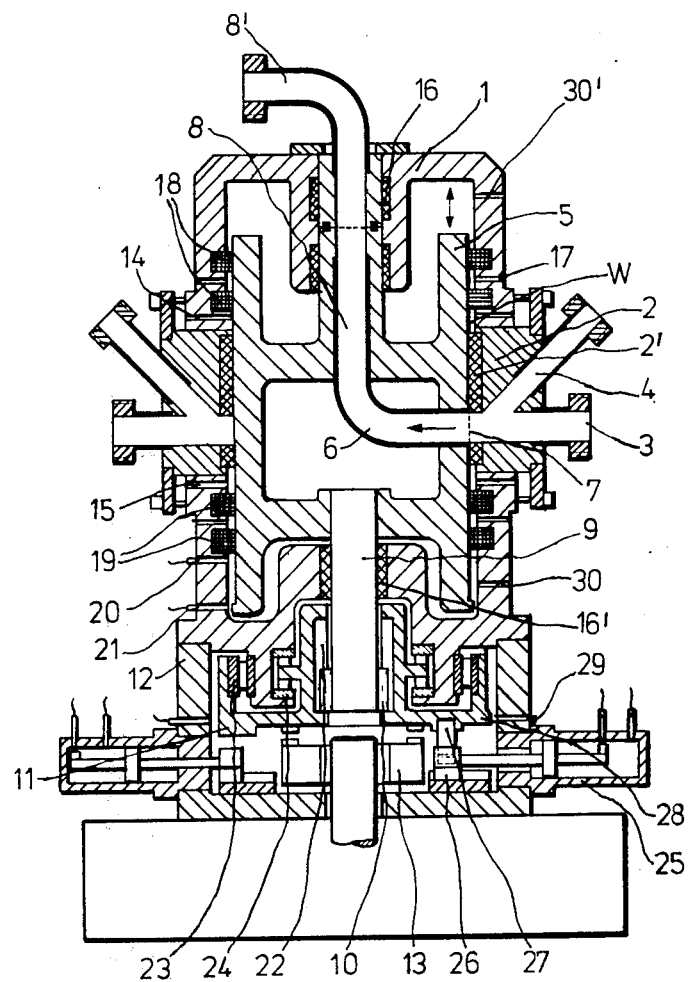
Figure 3:
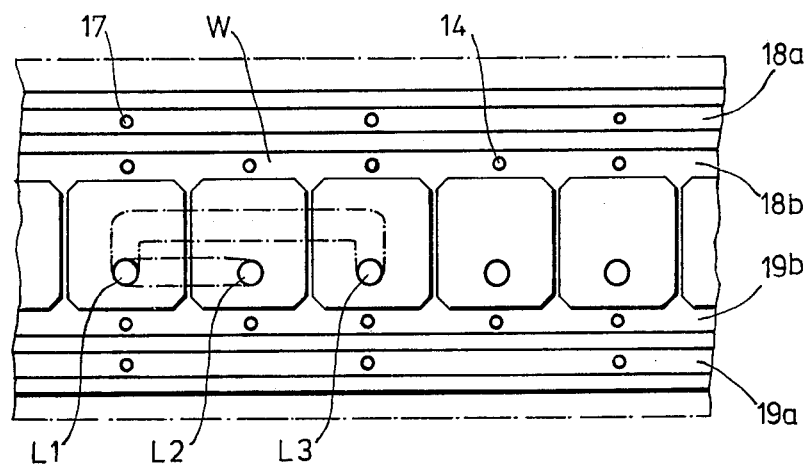
Figure 4:
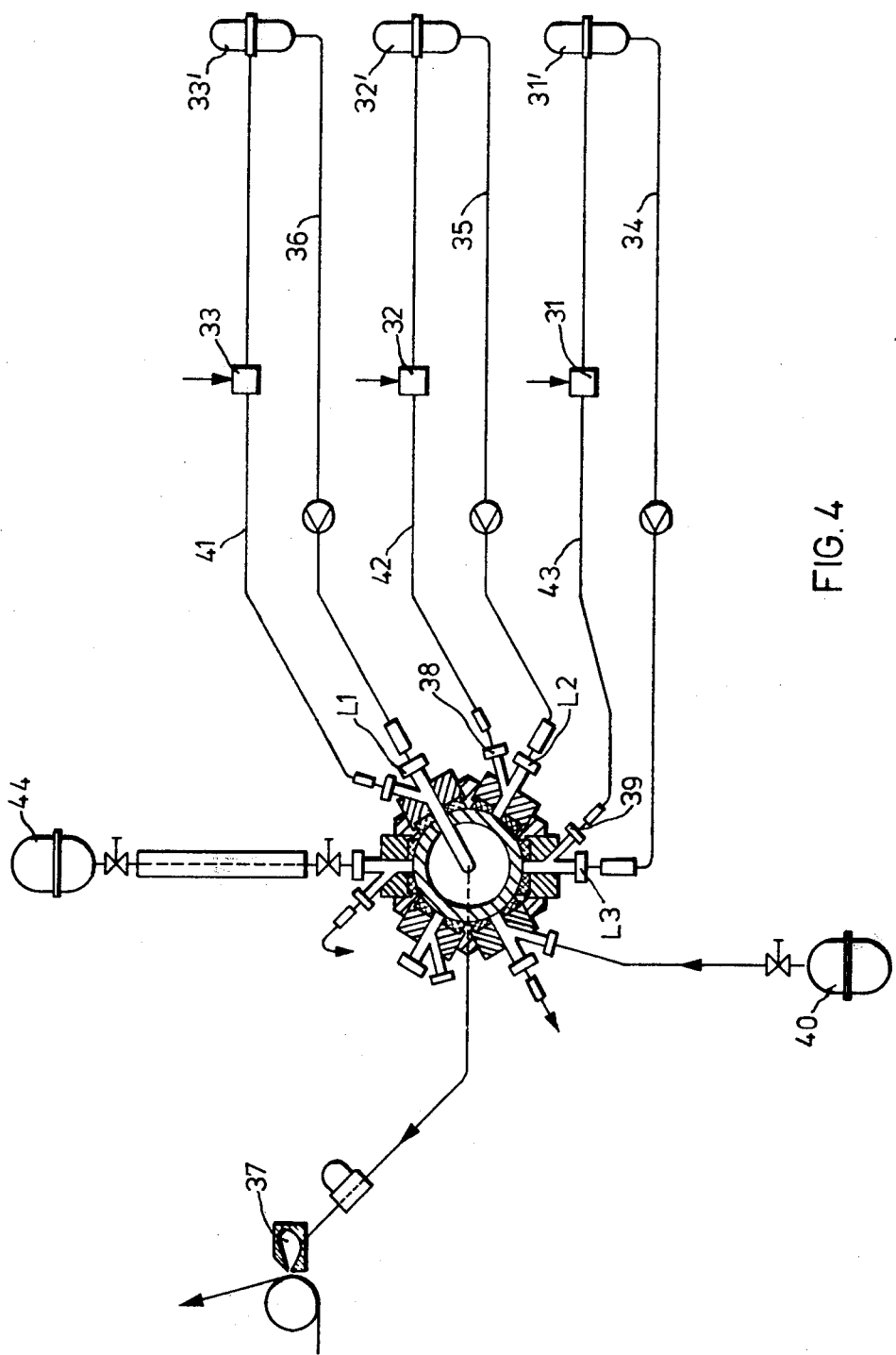

A preferred embodiment of the invention is illustrated in the accompanying drawings, in which:

FIG. 1 is a cross-section through the change-over device according to the invention, FIG. 2 is a longitudinal section thereof, FIG. 3 shows diagrammatically the layout of the cylinder developed over the circumference in the area of the sealing plates, and FIG. 4 shows diagrammatically a layout of a supply installation for coating photographic emulsions, using the change-over device according to the invention.

The change-over device shown in FIG. 1 has connections for six emulsion pipes L1 to L6, wherein each nozzle connection 3 in a sealing plate 2 provided with seals 2' leads to a change-over piston 5 situated in a cylinder 1 which may be subjected to pressure. The change-over piston contains a pipe 6 having an inlet and an outlet opening. The piston is located in such a way in FIG. 1 that the inlet opening 7 of the pipe is opposite one of the six emulsion nozzles so that the emulsion which arrives here is allowed to flow through to the coating station. Adjacent seals 2' of the plates do not push against each other, as a narrow gap W, into which water is fed from the outside, remains between them. Since the sealing plates are also sealed by gaskets at the top and the bottom as shown below, the wall of the change-over piston is rinsed with water in order to wash out through channels remains of emulsion which may have penetrated between the change-over piston and the cylinder during the change-over processes. Faults in the apparatus or poor seals may be noticed if the washed-out water is clouded by remains of emulsion containing gelatine.

The section of FIG. 2 shows the overall assembly of the change-over device. The cylinder 1 which may be subjected to pressure has holes for receiving the sealing plates 2, which each contain an emulsion nozzle 3 and are clamped to the cylinder 1 by cap screws C. A return nozzle 4 with an automatic pressure regulating valve 4' (FIG. 4) opens into the emulsion connection via which the emulsion not used for coating may be carried away. Water inlet channels 14 and outlet channels 15 on each plate allow the change-over piston to be rinsed with water at a controlled temperature. The change-over piston 5 itself is mounted in sliding sleeves 16 and 16' in the cylinder and may execute both a rotational movement and a lifting movement. The piston is provided with a pipe 6 having a radial inlet opening 7 and an axial outlet opening 8. The inlet opening always comes to rest opposite one of the emulsion connections 3 upon a completion of a change-over operation. Another rotatable outlet nozzle 8' is connected to the outlet opening, and this outlet nozzle provides a connection to the coating station.

In order to raise and lower the change-over piston it is subjected to the action of compressed air via channels 30 and 30'. The area over which the compressed air acts is limited in the cylinder by sealing elements, in the present case by so-called tandem seals 18 and 19. When the piston 5 is raised, the path of the emulsion to the coating station is temporarily blocked. During the change-over process, the emulsion is recycled via the return nozzle 4 into a general emulsifying circuit without bursts of pressure occurring in the pipe. The lifting movement of the piston is limited by the depth of an internal groove 22 of a rotating and positioning or rotary indexing unit 11 into which the piston rod 9 and the drive mechanism 10 of the change-over piston project. The end positions of the lifting movement of the change-over piston are detected electronically by means of the sensors 20 and 21. The indexing unit 11 is the principal element for positioning the change-over piston and it has a shape resembling an inverted cup provided with a raised, axially extending, cylindrical portion which receives the piston rod and the axially sliding rotary drive mechanism. The unit 11 is mounted radially and axially in the cylinder 1 by means of needle bearing 23 and 24 respectively.

The positioning unit and the change-over piston are turned via a toothed clutch 13 by means of a conventional pneumatic rotating cylinder. The individual emulsion connections are positioned exactly by means of a system of mechanical stops. A compressed air cylinder 25 is fixed on the housing 12 containing the positioning unit and the clutch and upon which the cylinder 1 rests, for each emulsion connection, and there is a stop block 26 on the piston rod of the compressed air cylinder. When the change-over piston is rotated from one emulsion connection to another, the stop block of the compressed air cylinder which has been activated is driven outwardly and contacted by two swivelling butt levers 27 which are arranged on the base of the positioning unit. The position of the change-over piston during the rotation is transmitted by means of a lug 28 to one of the sensors 29, which are provided for each of the emulsion connections.

The driving unit 11 is turned by the motor A, such as a conventional pneumatic rotating cylinder (FIG. 2). The lower teeth X of clutch 13 interlock with the upper teeth Y in the bottom of the indexing portion 11, at the same time piston rod R with stop block 26 extends from a pneumatically operated cylinder 25. Such cylinders with piston rods and stop blocks are provided for each of the connecting pipes 3. The indexing unit 11, which is a portion of clutch 13, has two swing out swivelling butt levers 27. FIG. 2 shows one of the two swivelling butt levers. The turning movement of the indexing unit 11 comes to a stop when lever 27 touches the stop block 26 which is in fully extended position. The change-over piston with pipe 6 and aperture 7 is now aligned with the chosen feed and return manifold pipe, (for example $L_2$ in FIG. 3).

When changing over from one emulsion connection to the immediately adjacent one, for example from L1 to L2, it is sufficient to turn the change-over piston without lifting it. However, it is necessary to lift the change-over piston, as shown in FIG. 3, when changing to an emulsion connection which is further away, for example from L1 to L3, since otherwise the emulsion remaining in the pipe of the change-over piston reaches an emulsion connection which is not to be used, in this instance L2. This remaining emulsion may be prevented from flowing into the water-filled intermediate chamber W by blocking the water outlets, since a higher pressure builds up on the rinsed area than in the change-over pipe. If the water outlet 15 is not blocked during the change-over process, such remaining emulsion is carried off with the water. However, it has been found that such a flow very rarely occurs, owing to the relatively high viscosity of the emulsions to be coated and relatively low pressure conditions in the pipe 6.

The so-called tandem seals 18 and 19 which seal the change-over piston in the area of the initially stressed pressure plates, are shown in FIG. 3. One sealing element 18a, 19a of each seal seals the piston against compressed air and the other element 18b, 19b seals it against water. Both media may flow out via the ventilation channel 17 if the tandem seal deteriorates.

In order to coat a predominantly flexible film support continuously with emulsion, using the change-over device according to the invention, described above, a corresponding number of emulsions for producing a photographic material are held in temperature-controlled heated reservoirs. As shown in FIG. 4, hose-pipes or tubes 34 to 36 lead from these reservoirs via intermediate containers 31 to 33 to the change-over device, with its various possible connections. Conventional devices 31' to 33' for filtering and degassing the emulsions to be coated may also be connected upstream of the device according to the invention. An emulsion which reaches the change-over device, for example from L1, flows directly to the coating apparatus when the change-over piston is in the corresponding position. The inlet to the coating station is blocked for the other emulsions and they flow via the return nozzles 28 and 39 into the corresponding emulsion line 41 to 43. When changing from one inlet to the adjacent one, for example from L1 to L2, it is sufficient to turn the change-over piston as mentioned and when changing over from L1 to L3, an additional lifting movement is required.

In this novel manner, the change from one type of emulsion to another may be carried out without a delay and without interrupting the coating process. The subsequent emulsion displaces the previous emulsion from the pipe between the change-over piston and the coating station. With modern coating processes using extrusion hoppers, cascade hoppers and similar processes, only a small volume of liquid is required in the coating station, that is only the quantity to be carried directly on to the film support, and this is aided by use of the change-over device according to the invention.

Depending upon the viscosity of the emulsions to be coated, successive emulsions may be mixed for a short period during the change-over. Since the change-over process may be linked to the counting mechanism of a coating apparatus, it is easy to separate the section of the film support coated with the mixed emulsions at the end of a coated roll. A washing solution, for example an aqueous gelatine solution from the container 40, may also be easily fed between the coating of two different emulsions, in order to displace the remaining emulsion from the change-over piston.

This method of operating is particularly advantageous if sample of emulsion, of which only small quantities of between 5 and 15 liters are generally present, are to be coated from an additional container 44 on an industrial coating apparatus. This ability to coat small quantities of samples of emulsion at any time and between coating with other emulsions is particularly valuable. Expensive experimental coating apparatus formerly had to be used for this purpose.

The change-over device according to the invention may be used on any coating apparatus, including on coating stations for coating auxiliary photographic layers which are arranged in the drying channel through which a film passes after the emulsion has solidified. Of course, the device according to the invention may be used not only for changing over, but also for interrupting a coating process by means of a simple lifting movement of the change-over piston. The installation may be controlled electronically or be moved manually and may be equipped with additional apparatus for measuring and dosing the emulsion without departing from the scope and spirit of the invention in accordance with the following claims.

We claim:

1. A change-over device for continuously coating a plurality of emulsions onto a film support at a coating station for the production of photographic materials, comprising a cylinder for containing pressure and which has a plurality of radial apertures, a sealing plate closing each of the apertures, each of the sealing plates having mounted thereon a feed and return pipe manifold, clamping means securing the sealing plates to the cylinder at the apertures in pressure-tight relationship, a change-over piston in the cylinder which is capable of both rotational and axial movements, the piston having an inlet conduit having a radial portion with inlet means for communicating with a selected one of the manifolds and an axial portion with an outlet means for connection to the coating station, a piston rod connected to the piston and to a rotary drive member, a clutch for transmitting rotational force between the rotary drive member and the piston rod for rotating the piston, the clutch including a rotary indexing unit rotatably mounted in the cylinder and surrounding the piston rod whereby the inlet means is aligned and connected to a selected one of the feed and return pipe manifolds, axially sliding rotary drive means connecting the clutch to the piston rod, fluid pressure means connected to the cylinder on two ends of the piston whereby the inlet means in the piston is moved axially out of and into axial alignment with the manifolds for alternatively blocking flow and causing flow between the selected one of the manifolds and the inlet conduit in the piston whereby a selected one of the emulsions is supplied to the coating station.

2. A device according to claim 1, wherein the cylinder and piston are sealed above and below the radial apertures by tandem ring seals between the cylinder and piston, circulating means are provided for introducing temperature-controlled water between the cylinder and the piston between the tandem seals via inlet connections in the plates, an outlet channel being provided in the plates for the water subsequently to flow out.

3. A device according to claim 2, wherein the cylinder has compressed air inlets situated beyond and below the tandem seals.

4. A device according to claim 3, wherein the cylinder has a deaerating channel between the tandem seals via which compressed air or water escapes.

5. A device according to claim 1, wherein the cylinder has a base, the change-over piston is disposed against the base of the cylinder in the position for coating so that the radial portion of the inlet conduit is disposed opposite a selected feed and return manifold.

6. A device according to claim 1, wherein the outlet means of the inlet conduit is rotatable.

7. A device according to claim 1, wherein the rotary indexing unit has an inverted cup-shaped profile which defines a cylindrical cavity which receives the piston rod and the axially sliding rotary drive means and the clutch being toothed for positive engagement.

8. A device according to claim 7, wherein the rotary indexing unit is rotatably mounted in needle bearings.

9. A device according to claim 1, wherein the rotary indexing unit has a compressed air stop cylinder and a stop block for each feed and return manifold, butt levers in the rotary indexing unit, and the stop block being engageable by the butt levers when the rotary driving member rotates the piston to align the inlet means of the inlet conduit in the piston with a selected one of the feed and return manifolds.

10. A device according to claim 9, wherein a lug is provided on the rotary driving member and a sensor in the device disposed opposite the lug to sense the position of the piston in relation to the plurality of feed and return manifolds.

11. A device according to claim 10, wherein further sensors which are axially offset from one another are provided to detect the axial position of the piston.

12. A device according to claim 1, wherein control means are provided which are constructed and arranged to rotate the piston when changing from one manifold to an adjacent manifold and to also move the piston axially when changing to a nonadjacent manifold whereby flow of emulsion from one manifold to the other is prevented.

* * * * *